(12) United States Patent
Nair (10) Patent No.: US 11,576,041 B2
(45) Date of Patent: Feb. 7, 2023

(54) SYSTEM AND METHOD FOR AUTHENTICATING USING A MULTI-PROVIDER PLATFORM

(71) Applicant: PayPal, Inc., San Jose, CA (US)

(72) Inventor: Rahul Nair, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 433 days.

(21) Appl. No.: 16/727,899

(22) Filed: Dec. 26, 2019

(65) Prior Publication Data

US 2021/0204120 A1 Jul. 1, 2021

(51) Int. Cl.
*H04L 12/06* (2006.01)
*H04W 12/06* (2021.01)
*H04W 12/63* (2021.01)
*H04W 12/69* (2021.01)

(52) U.S. Cl.
CPC ........... *H04W 12/06* (2013.01); *H04W 12/63* (2021.01); *H04W 12/69* (2021.01)

(58) Field of Classification Search
CPC ..... H04W 12/06; H04W 12/63; H04W 12/69; H04L 63/0853; H04L 63/0861; H04L 63/18
See application file for complete search history.

(56) References Cited

U.S. PATENT DOCUMENTS

| | | | |
|---|---|---|---|
| 2011/0219230 A1* | 9/2011 | Oberheide | H04W 12/06 713/168 |
| 2018/0096354 A1* | 4/2018 | Kohli | H04L 63/0861 |

* cited by examiner

*Primary Examiner* — Baotran N To
(74) *Attorney, Agent, or Firm* — Haynes and Boone, LLP (57) ABSTRACT

Aspects of the present disclosure involve systems, methods, devices, and the like for user authentication. In one embodiment, the user authentication occurs using a multi-provider platform. The multi-provider platform enables the use and retrieval of user information from the given provider for the use and assessment of information associated with the user. User information may also be received over a web link communicated at least in part by a risk checkpoint component to a user device, wherein the user information received and that retrieved may be jointly used for determining user authentication.

20 Claims, 6 Drawing Sheets

SYSTEM AND METHOD FOR AUTHENTICATING USING A MULTI-PROVIDER PLATFORM

TECHNICAL FIELD

The present disclosure generally relates to user authentication, and more specifically, to user authentication using a multi-provider platform.

BACKGROUND

Nowadays with the proliferation of electronics, users are constantly relying on their electronics for access to social media, transacting, messaging, etc. However, with such reliance comes the need for remote connectivity and authentication. User authentication and consequently verification are instrumental in ensuring a user information is securely and correctly accessed. User authentication and verification often require the use of passcodes, phrases and other forms of input mechanisms. Such authentication processes may be cumbersome and time consuming as passwords may be forgotten, and authentication could require lengthy conversations with a service agent and even prone to interception attacks. As such, some providers are turning to biometric authentication as a solution, however such authentication processes may be limited in scope and/or availability. Therefore, it would be beneficial to have a method for authenticating using a complete solution that leverages the capabilities of multiple providers.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for user authentication. In one embodiment, the user authentication occurs using a multi-provider platform. The multi-provider platform enables the use and retrieval of user information from the given provider for the use and assessment of information associated with the user. User information may also be received over a web link communicated at least in part by a risk checkpoint component to a user device, wherein the user information received and that retrieved may be jointly used for determining user authentication.

Nowadays with the proliferation of electronics, users are constantly relying on their electronics for access to social media, transacting, messaging, etc. However, with such reliance comes the need for remote connectivity and authentication. User authentication and consequently verification are instrumental in ensuring a user information is securely and correctly accessed. User authentication and verification often require the use of passcodes, phrases and other forms of input mechanisms. Such authentication processes may be cumbersome and time consuming as passwords may be forgotten, and authentication could require lengthy conversations with a service agent and even prone to interception attacks. Additionally, the passcodes may require multiple user inputs which can introduce friction to the user as well. For example, consider FIG. 1A wherein a user is attempting to complete a transaction which requires a form of authentication on a user device 102.

Figure 1A:
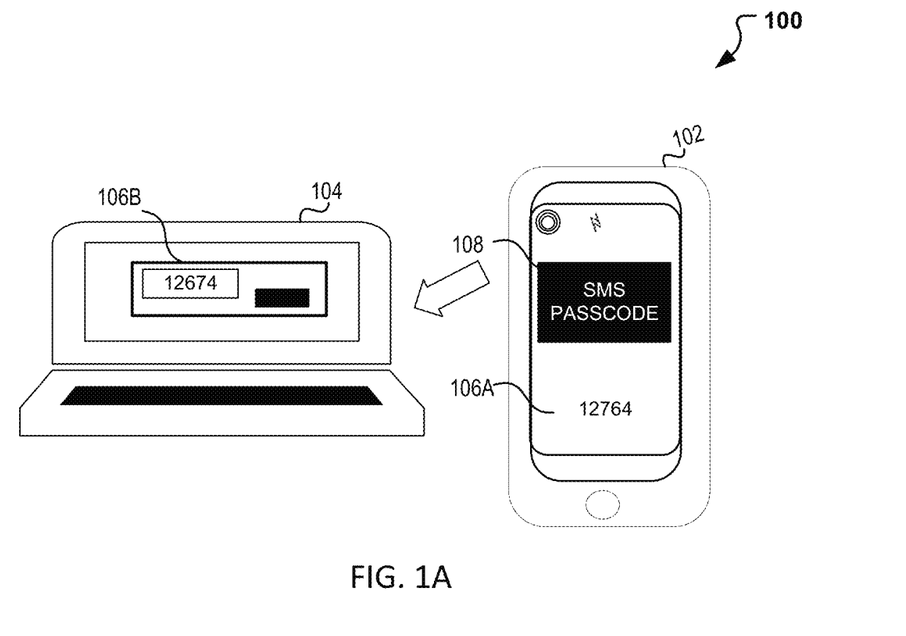
FIGS. 1A-1B illustrate exemplary applications of authentication.

The user device 102 may be a tablet, iPad, cell phone or the like. For exemplary purposes, user device 102 can be a smart phone. The user device 102 may be used for web browsing, video streaming, bill payments, and online purchases. Additionally, the user device 102 may be equipped with applications that enables the user to make purchases and transfers using payment provider applications and/or a digital wallet. Further, the user device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. For example, the user device 102 can be used to communicate with a personal device 104. In the communication, the user may use a gallery and/or the camera in the user device 102 for taking, retrieving, or accessing an image of the user for use in authentication. Additionally, or alternatively, in the communication, the user may use biometrics for authentication. As another example, the user device 102 can be used for presenting and communicating an SMS message 108 for use in authentication.

Accordingly, as a user is needing to authenticate or as step-up authentication may be necessary, an SMS message 108 and passcode 106A may be sent to the user device 102. In response, the user inputs the received verification code 106A on a secondary personal device 104 as input 106B. Alternatively, the verification code 106A may be received and input at user device 102. As can be appreciated, the use and input of the SMS code 106 comes with various disadvantages. For example, friction on the user is introduced as the user now needs to receive and enter the verification code 106 into the screen of the user device 102. As another example, the transmission of such verification code 106 is now prone to interception. If interception occurs, a bad actor may take the verification code 106 and the user account and information may be compromised. As yet another example, the transmission of the verification code 106 can also be forwarded to another device (intentionally or inadvertently) which can then expose the user account and information as well. Thus, conventional use of SMS messages 108 for authentication are inferior.

Figure 1B:
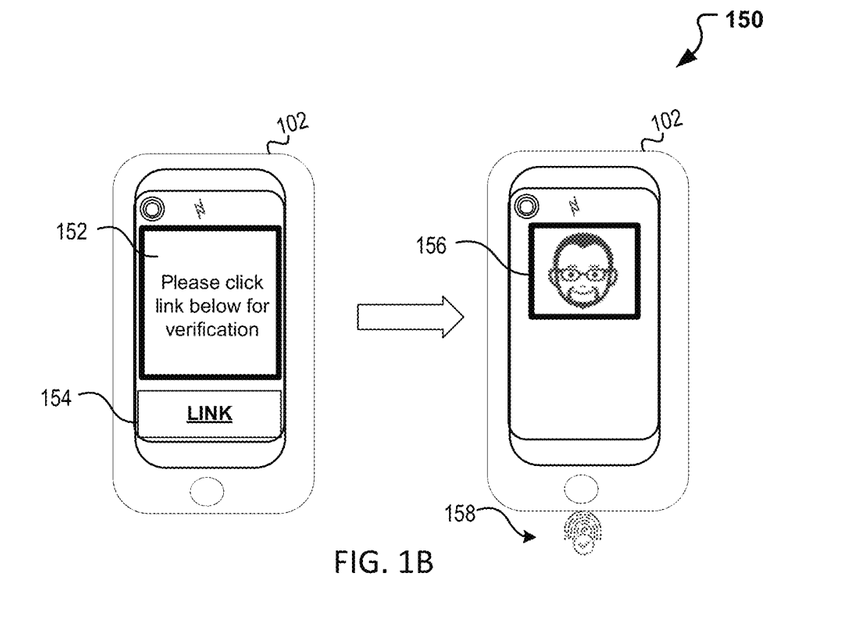

To mitigate both the friction on the consumer and vulnerability on the account, industry has turned to the use of biometrics for authentication. Turning next to FIG. 1B, an exemplary illustration of user authentication with biometrics is presented. Note that biometrics may include fingerprints, face, voice, heart rate, and other bodily functions and features.

Biometrics and in particular fingerprints have become increasingly popular in authentication. A biometric fingerprint for authentication, however, is closely tided tightly to the operating system on a user device 102 and exposed via the mobile applications on the device 102. As such, organizations, entities, providers, and the like are able to leverage fingerprint authentication only via a mobile application on the user device 102. Thus, again several limitations are placed on these organizations, entities, providers, and the like as not all users have installed or have access to the corresponding mobile application.

Accordingly, in one embodiment, a system and method are introduced which enables biometric authentication using the mobile web. That is to say, a system and method are introduced which link the use of a fingerprint web authentication page via an SMS. To illustrate, consider FIG. 1B. At FIG. 1B, a link 154 may be deliver over an SMS which enables the user to simply click the link for access to the mobile web page where biometric authentication may occur. At which point the user may simply enter his/her biometric fingerprint 158 and/or image capture 156 for authentication. As such, the need for and use of a verification code 106 is now eliminated. Additionally, the mobile application requirement is removed, and possible interception of the message is no longer at risk as the user biometric is now needed for the authentication.

To enable the user of biometric authentication over SMS, the organization, entity, provider or the like collects a biometric profile for the user. That is to say, at on boarding, the provider is able to request (with appropriate permissions), the user biometrics for later use in authentication and verification. A voice sample, image, photos, fingerprint and the like may thus be obtained from a user. Note that additionally or alternatively, the user biometric profile may be created and updated over time and with use of the particular entities (providers, organizations) services.

In some instances, the provider in need of the authentication may have an incomplete biometric profile. Rather than continuously asking the user for biometric updates, the provider may also leverage relationships, linkages and partnerships in place with other providers (entities, organization, and the like) for use of those biometrics. For example, consider a scenario where a third-party service provider has a relationship with a social media platform. Such social media platform may have account information including images, photos and the like associated with a user. Thus, the third-party service provider is able to access those images (with appropriate permissions) for use in a verification. Thus, in one embodiment, a third-party service provider may leverage an existing account linkage with a mobile web browsing provider for presenting the biometric authentication link via an SMS link. In another embodiment, the third-party service provider may leverage a relationship with a social media provider for retrieving previous images of a user for use in authenticating with a current image capture. Still in another embodiment, the third-party service provider may leverage a relationship with yet another provider with location services for use in the authentication of the user.

Figure 2:
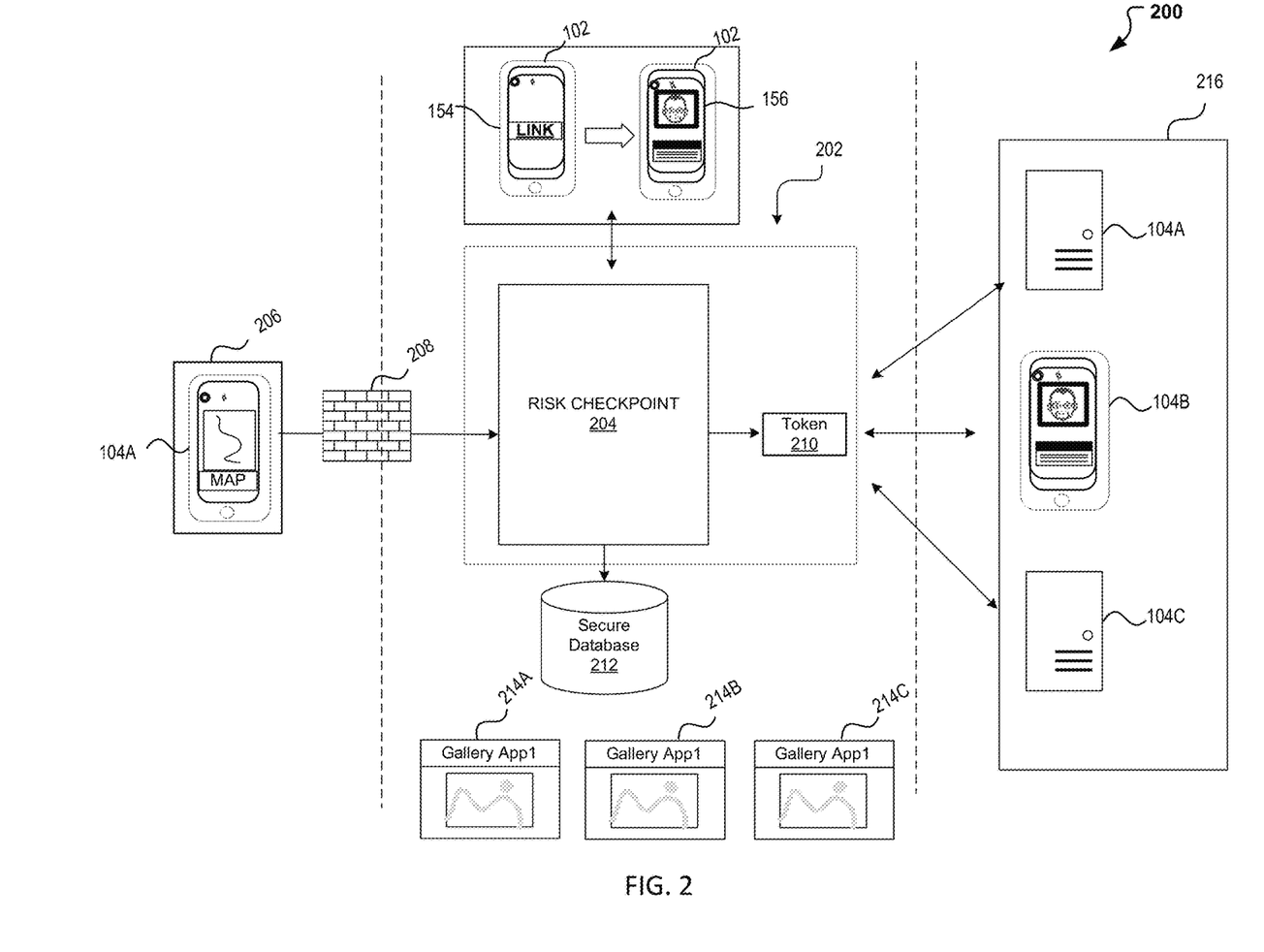
FIG. 2 illustrates a block diagram illustrating an exemplary architecture for device verification and user authentication.

Thus, turning next to FIG. 2, an exemplary block diagram illustrating an architecture for device verification and user authentication is presented. At FIG. 2, a user device 102 is presented with a link 154 for authentication. As illustrated, in this instance, the user has provided an image capture or "selfie" 156 of him/herself. The image capture can thus be used as biometric authentication. Accordingly, the third-party provider system 202, can include at least a risk checkpoint component 204 for determining if indeed the verification provided (e.g., image capture 156) is a match. The risk checkpoint component 204 can therefore function to enable and facilitate the presentation of the link to obtain the image captured 156. At receipt of the image capture 156, the risk checkpoint component 204 can process the image capture 156 in addition to other user and device information for verification. For example, consider the case wherein in addition to the image capture, user device 102 location is also retrieved. As such, the risk checkpoint component 204 can communicate with another service provider 206 which may have live location information about the user device 102. The communication with the another service provider 206 may be leveraged through an existing partnership with that provider. Thus, provided correct permissions 208 are available, the another service provider 206 can transmit location information available about the user to the third-party service provider 202 for use in verification by the risk checkpoint component 204. As the trusted location information and image captures 156 are received, they may be further store and harvest the information in at least the secure database 212 or other repositories for future use.

Additionally, because the user may provide an image capture 156, the image capture 156 is thus available for use in verification. As indicated, in some instances, the third-party service provider 202 may obtain and create a biometric profile for the user. Such biometric profile can include photos, voice, fingerprint, and other biometric details about the user which may be stored in a secure database 212. The secure database 212, can thus include a collection of galleries 214A-214B for the users in addition to tables, servers, data structures, and the like retrieval. Accordingly, the secure database 212 may be accessed for the retrieval of user profile information for use in conjunction with the image capture 156 received for the verification. Note that in some instances, the user biometric profile may be incomplete, outdated, or could benefit from additional user biometric information. As such, yet other providers 216 may be used and communicated with for the retrieval of relevant information in the verification. For example, a social media provider may be linked with the user profile and used for the verification as current posts and images can be acquired. Such linking may include a prior login with the third-party service provider 202 and/or the other providers 206, 216.

Additionally, the other providers may also capture and include image capture location information. As such this too can be used in the verification. Thus, with the use of a token, permission, or other verification 210, the other providers 216 and the third-party service provider 202 can communicate and user information shared and processed by the risk checkpoint component 204. Thus, a combination of other provider 206, 216 information may be used in combination with current user profile information (at the secure database) may be used for determining if a user verification is achieved. For determining the user verification, some or all provider information may be used. For example, a provider 216 may provide five images all which are used. As another example, only one of the images may be used and one or a combination of user profile images used. Yet in another example, none of the images received are used.

The determination can also include the scoring of the information provided for verification. For example, the providers can provide a numerical assessment of the verification the provider 216 performed. The third-party service provider 202 can thus use the provider assessment, a combination of the provider assessment, or simply use the information and the third-party provider 202 complete all assessments. Additionally, or alternatively, another provider 206 can provide one assessment, the other providers 216 yet another, and the third-party provider 202 can use an average, their own, or a combination thereof. In addition, as user assessments are obtained, the outcomes may be run and compared against the third-party provider's own trusted assessment and reports.

In some embodiments, the risk checkpoint component 204 may determine what level of information to use and from what providers given the type and risk associated with the transaction requiring the verification. Thus, the higher the risk, the more involved the analysis and verification process will be.

Also note, that a link via SMS is described there as used to prompt the user for verification. However, the link may be presented using other methods and the transmission request for verification is not limited to a link. Further, the service providers 212 as referenced herein can include another entity, organization, or the link whose information may be accessed and available on a device 104 with the device including a laptop, computer, system, server, cloud, and the like.

Figure 3:
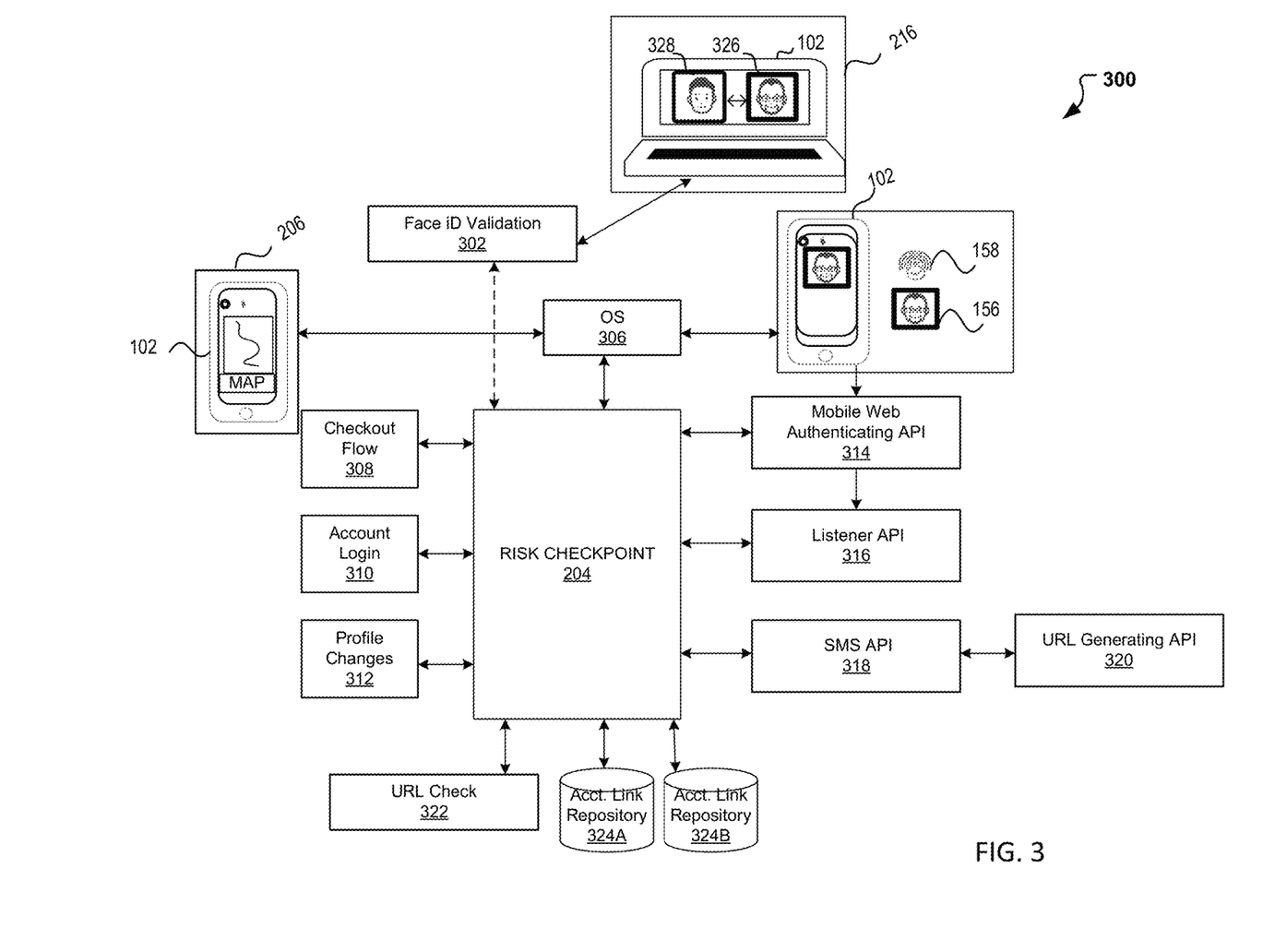
FIG. 3 illustrates exemplary block diagram of an architecture for authenticating using multi-provider authentication.

Turning next to FIG. 3, an exemplary block diagram of an architecture for authenticating using multi-provider authentication is presented. As described above, in one embodiment, a multi-provider system 300 is introduced for use in authentication while leveraging the capabilities of those entities, providers, and organizations with whom the current system and/or third-party service provider 202 has an at least a partnership or link with. As generally described above, the risk checkpoint component 204 is a central processing mechanism from which verification, routing, and processing can occur. In one embodiment, the checkpoint component 204 is used and designed to obtain information about a user associated with a device 102 from one or more providers 206, 216 and make a determination regarding a user authentication based in part on the information collected from the other providers 206, 216.

As illustrated, the providers 206, 216 can thus communicate with the risk checkpoint component 204 via the OS system 306 of the device. That is to say, the operating system communicates via an application of the providers 206,216 with the providers for the retrieval, assessment, and receipt of user information. Additionally, or alternatively, the providers 216 may communicate with the risk checkpoint component 204 directly. For example, consider a payment provider 216 with the capacity to perform face identification. Such provider 216 may retrieve available images 328 of the user (e.g., via posts) and perform face ID validation using at least the face ID validation block 302. Face ID validation block 302 can therefore retrieve the provider 216 image(s) and perform a validation assessment against selfie or image capture 156 received. The selfie or image capture 156 may be received at the user device 102 and provided to the risk checkpoint component 204 which may be in communication with or coupled to the face ID validation block 302. Note that validation can also occur at the risk checkpoint component 204 and computation by the Face ID Validation block 302 associated with the provider 216 is therefore optional. Accordingly, the face validation assessment performed by the face ID validation block 302 may be used in the assessment, in conjunction with the assessment by the risk checkpoint component 204 and/or ignored or skipped all together. Additionally, those images stored, retrieved, and provided by the provider 216 may be transmitted directly to the third-party provider 202 for use by the risk checkpoint component 204 for authentication.

In some embodiments and further to the face ID authentication, fingerprint biometric authentication can occur. Fingerprint 158 authentication therefore includes the communication of the biometric through the OS 306 and to the risk checkpoint component 204. Additionally, at least a mobile web outhunting API 314 may also be involved in the authentication. The mobile web authenticating API 314 may be used at least in providing the user with the link and redirect from the SMS message and to the request to enter the biometric. The biometric may be via the use of a camera (e.g., selfie), a sensor (i.e., fingerprint), or any other combination of sensors available at the device 102 or in communication with the device 102 (e.g., a smart watch, ring, jewelry, health monitor, glasses, IoT device, etc.).

A listener API 316, SMS API 318 and other similar APIs may also be available and used during the authentication processes. For example, the listener API 316 may be available to listen to and detect for the input by a user. As another example, the SMS API 318 may be available for use and transmission of the SMS notification with a request and link for verification. In instances where the SMS API 318 is used, a URL Generator 320 may also be used and in communication with the device 102 and third-party service provider 202. As the name indicates, the URL generator 320 may be used for the generation of the link to be provided to the user for the submission of the biometric, location, image, or the like for verification.

Other components associated with and in communication with the risk checkpoint component 204 can include at least a checkout flow 308, account login component 310, a profile changes component 312, and a URL check component 322. The checkout flow 308 may be used to ensure correct checkout processed, procedures, validations, and processing associated with the checkout in a transaction are completed correctly. The account login component 310 may be used for identifying and logging in the user to the device 102. The account logging component 310 may also be used in linking the user account with the other providers 206, 216 that the user may be logged into. The profile changes component 312 may be used for updates associated with the account that may need updates. Updates can include name, address, account information, as well as biometric profile changes that may need updating. Note that the changes, including those associated with linked accounts, the user information may be stored in one or more repositories 324A-324B. Additionally, the repositories 324A-324B can also store and manage historical as well as new an incoming user information and biometrics.

To confirm that the information received and that transmitted by the web browser, a URL check component 322 may be used. The URL check component 322 can therefore communicate with and be coupled to the risk checkpoint 204 for the access to and check of the information arriving from the various devices 102, providers 206-216, and components 314-318. Note that more or less components may be used in conjunction with the third-party service provider 222 for use with and for the authentication of a user in conjunction with a plurality of other providers 206, 216 and their associated platforms.

Figure 4:
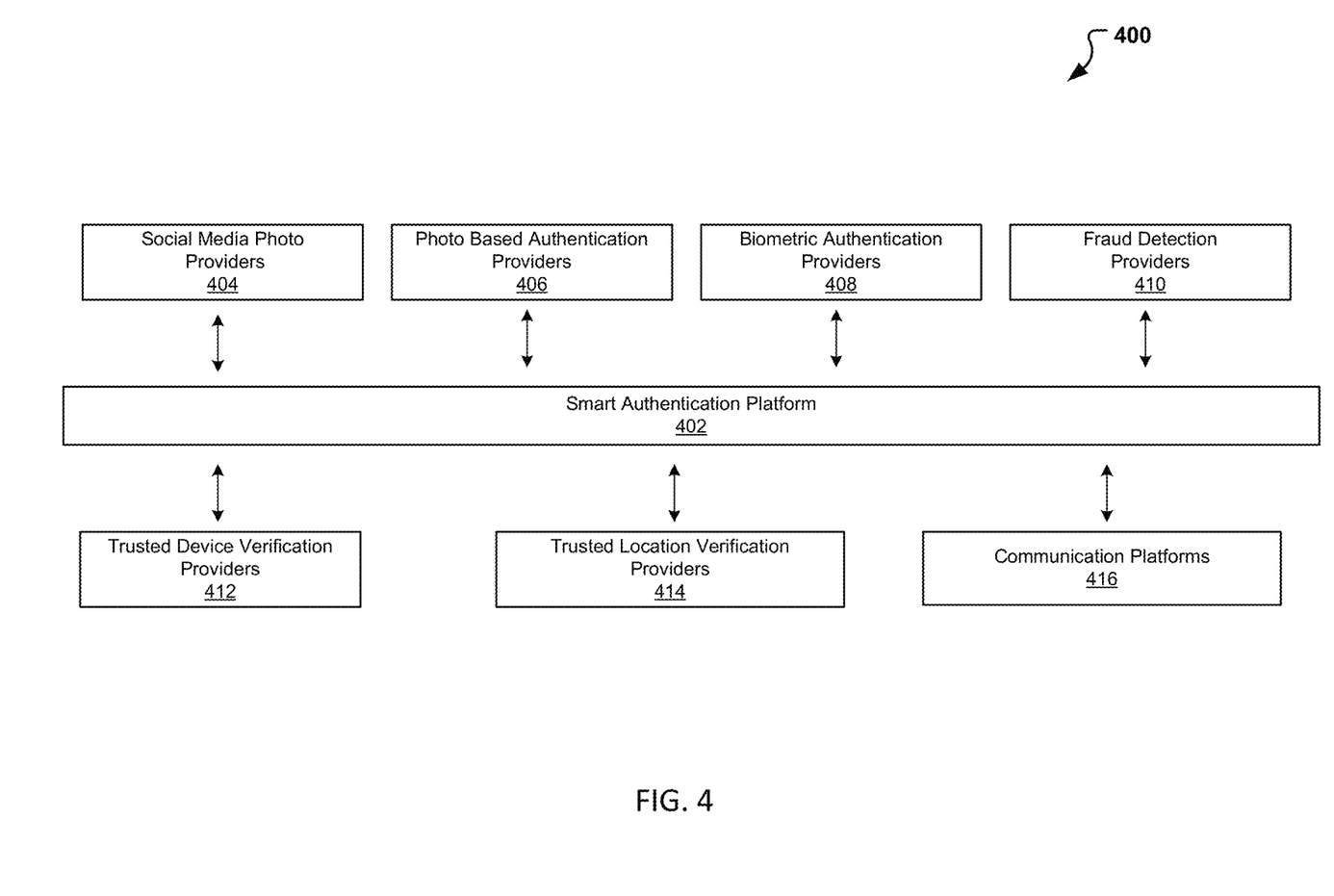
FIG. 4 illustrates exemplary a multi-provider platform.

Now because the third-party provider 222 is communicating with multiple providers 206-216, architecture system 300 may be presented as a platform-based architecture. Turning next to FIG. 4, the multi-provider system is then presented as an exemplary platform-based architecture 400. In one embodiment, the exemplary platform base architecture 400 includes a smart authentication platform 402 designed to communicate with a plurality of provider platforms 404-416 design to plugin and link with the smart authentication platform 402. In one exemplary embodiment, the smart authentication platform 402 can include an association with social media, photo based, biometric, feud detection, trusted device and location verification, and location-based providers. The social media photo providers platform 404 can include those providers whose users post photos which can be used in the verification. For example, the social media photo providers can include Instagram. The photo-based authentication providers 406 can include providers whose platform can retrieve recent photos and perform validation on the photo based authentication providers platform 406 or the third-party provider's smart platform 402. For example, the photo-based authentication providers can include Facebook.

Biometric authentication provider platforms 408 can include the platform of those providers who can access and use a user's biometrics for authentication. In particular, the biometric authentication providers can include those who can provide and compare user's biometrics including fingerprints, heart rate, sleeping patterns, exercise routine, blood pressure, etc. An example of a biometric authentication provider platform 408 can include Apple, Google, Fitbit, etc. Fraud detection provider platforms 410 can include those providers whose user information may be used for detecting and assessing fraud. Such providers can use information like location, purchasing history, transaction type, etc. to make the fraud detection assessment. An example of such fraud detection providers can include Pindrop.

Trusted device verification provider platforms may also link and communicate with the smart authentication platform 402. Trusted device verification providers can be those providers who can verify and use the device 102 information in the verification. For example, the device ID, SSID, and other similar information. An example trusted device verification provider can include AT&T. Trusted location verification providers platforms 414 are those platforms associated with providers whose location information may be used and verified and/or location transmitted to the smart authentication platform 402 for use in authentication. Trusted location verification providers can include those who can track the user device location for use in the authentication. For example, a trusted location verification provider can include Google. Communication provider platforms 416 may also be linked to the smart authentication platform. For example, this can include cellular telecommunication providers who can retrieve user device information and used in the verification. An example communication platform provider can include Twilio.

Note that with the implementation and integration of the smart authentication platform 402, a user/company, merchant, entity of the like may now touch a vast number of providers and this dynamic combination of providers can thus get exercised in various invocations such that every invocation of the smart authentication platform 402 can include a request to exercise a different combination of providers 404-416.

Figure 5:
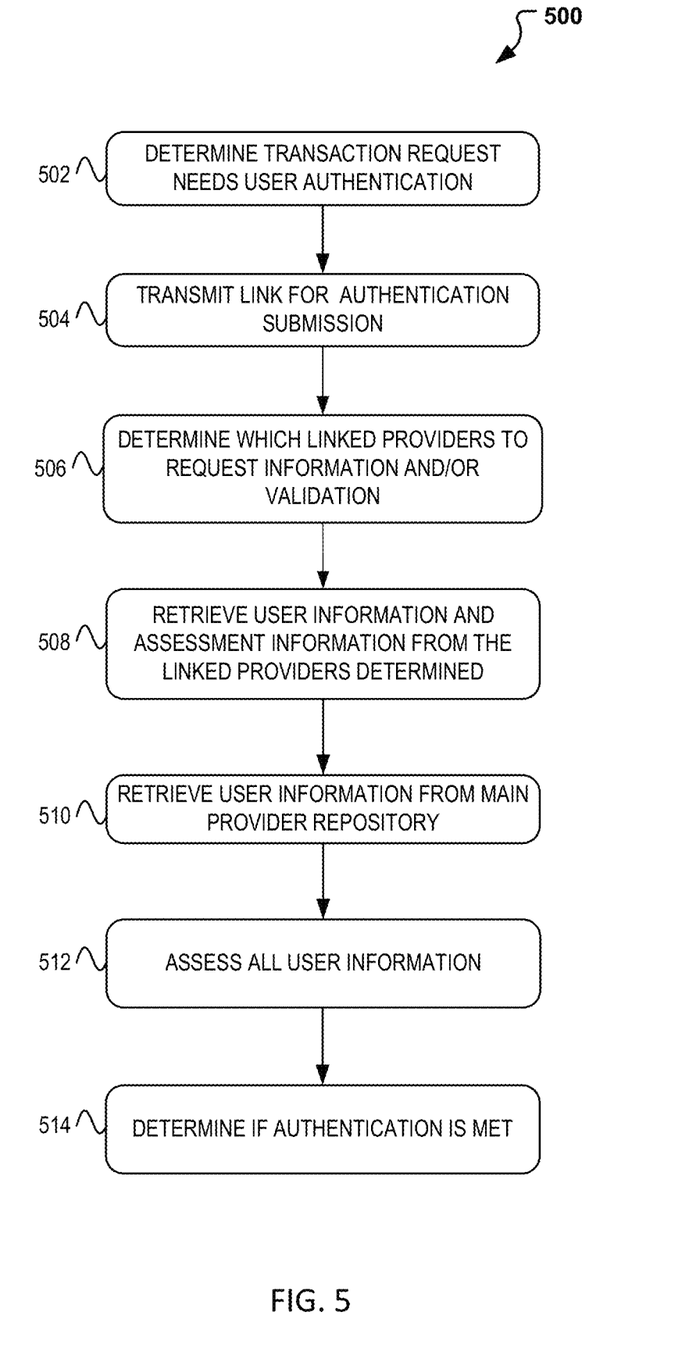
FIG. 5 illustrates a flow diagram illustrating operations for authentication using the multi-provider platform.
Figure 6:
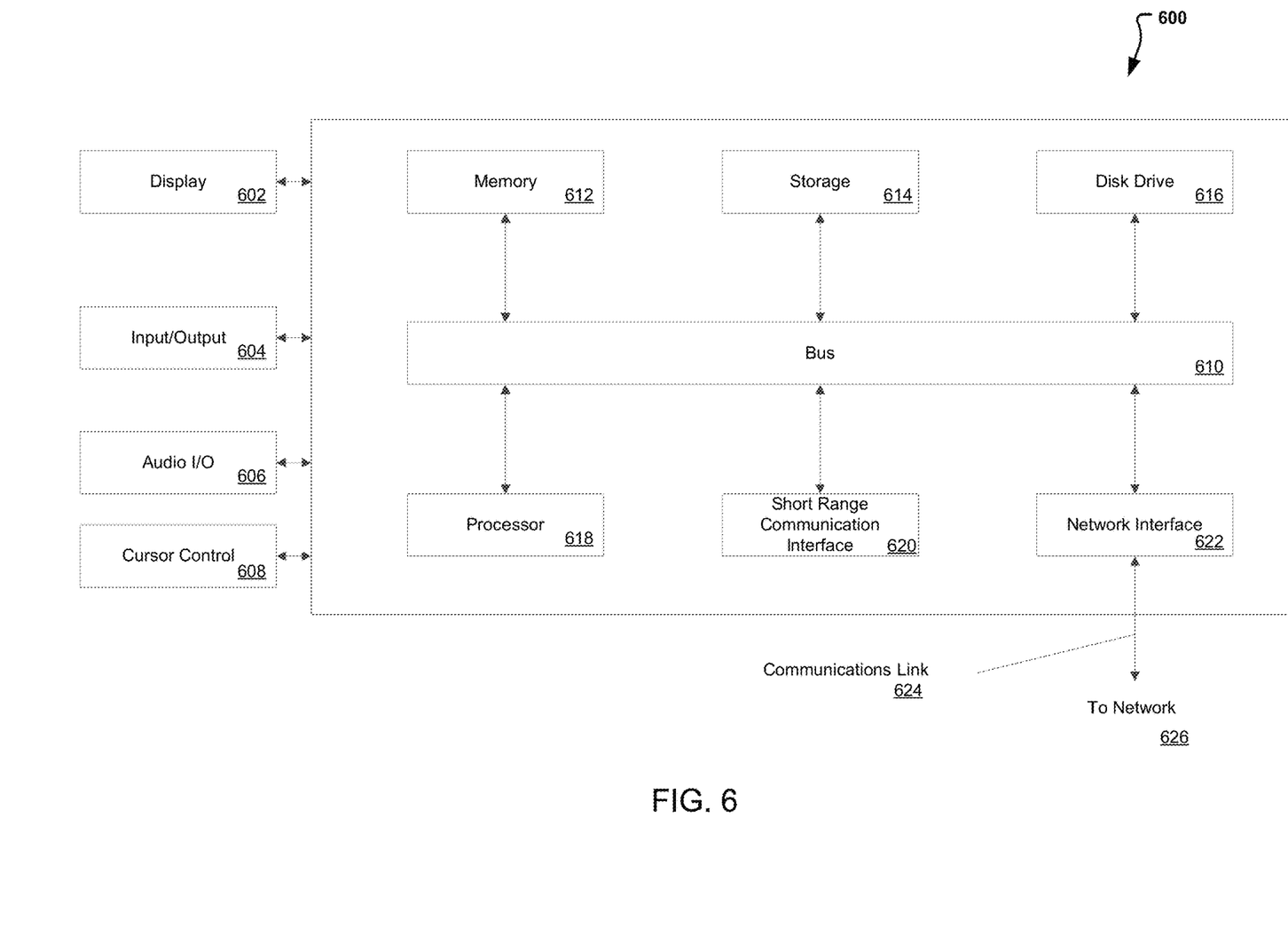
FIG. 6 illustrates an example block diagram of a computer system suitable for implementing one or more devices of the communication systems of FIGS. 1-5.

To illustrate how the multi-provider platform may be used, FIG. 5 is introduced which illustrates example process 500 that may be implemented on a system 600 of FIG. 6. In particular, FIG. 5 illustrates a flow diagram illustrating how multi-provider platform system provides the ability authenticate a user using a combination of information received from the various provider platforms. According to some embodiments, process 500 may include one or more of operations 502-514, which may be implemented, at least in part, in the form of executable code stored on a non-transitory, tangible, machine readable media that, when run on one or more hardware processors, may cause a system to perform one or more of the operations 502-514.

Process 500 may begin with operation 502, where a transaction is in process and a determination is made that the transaction request involves a user authentication. Note that this can include a login, profile update, purchase, money transfer, service request, remittance, and the like wherein a user authentication is used. The user authentication can be a first-time authentication or can include a step-up authentication wherein the risk associated with the transaction is larger and further verification is needed. In addition, note that the type and level of risk may designate what authentication may be allowed including the use of a facial or voice ID, a fingerprint, other biometric, location, device, OTP, etc. Additionally, or alternatively, the user may be able to provide any one or combination of those inputs for authentication. Further, the request for authentication can come in the form of an email, text, pop notification, or the like. In one embodiment, the request for authentication can come in the form of an SMS.

Accordingly, process 500 continues to operation 504 wherein a web link may be sent to the user device over an SMS for input by a user authentication. The link transmitted may include a redirect of the user to a request for a fingerprint submission, an image capture, location verification, and the like. As the user inputs and transmits the requested authentication, the received information may be processed by the risk checkpoint 204 where at operation 506 a determination may be made to determine which of the linked providers to request information and/or validation. That is to say, as the user information is received at the multi-provider architecture a determination is made as to which provider information may be needed and retrieved. Additionally, as the user information is received, a determination may further be made as to whether the provider validation or assessment will also be used.

At operation 508, those providers linked to the multi-provider platform determined to be used in the authentication may be communicated with and the associated information retrieved for the user. Additionally, if the assessment for the linked information is to be performed, this may occur at operation 508.

Continuing with process 500, at operation 510, user information may be retrieved from a secure database or repository of the third-party service provider. This information may be used solely for determining the authentication. Alternatively, the provider information may be used for the authentication. Still as another alternative, a combination of both other provider and the third-party provider information may be used for the assessment. The assessment may occur at operation 512 with a final determination on the authentication at 514. If the determination is made that the user has met the authentication assessment, then the transaction request may proceed.

Note that these operations are presented as exemplary processed and more or less operations may be involved in the process. In addition, although some provide platforms are listed and mentioned herein, note that other provider platforms and information may be obtained, are used herein. Additionally, the order and number of operations may vary, and some operations may occur before or after those mentioned.

FIG. 6 illustrates an example computer system 600 in block diagram format suitable for implementing on one or more devices of the system in FIGS. 1-5 and in particular verification system 200. In various implementations, a device that includes computer system 600 may comprise a personal computing device (e.g., a smart or mobile device, a computing tablet, a personal computer, laptop, wearable device, PDA, etc.) that can communicate with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as Wi-Fi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise present with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute instructions to cause the system to:
determine, via a wireless network communication, a request for a user transaction includes an authentication;
transmit a Short Message Service (SMS) link for an authentication input;
in response to receiving user information, determine which linked providers associated with the system to request the user information from;
retrieve provider information for a user associated with the request for the user transaction from the linked providers determined;
perform a user assessment on the retrieved provider information and the user information received; and
authenticate the request for the user transaction based in part on the user assessment performed.

2. The system of claim 1, executing instructions further causes the system to:
request, from the linked providers determined, a provider assessment based on the provider information and the received user information.

3. The system of claim 2, wherein authenticating the request involves both the user assessment and the provider assessment.

4. The system of claim 1, wherein the authentication input includes a redirect from the SMS link for a biometric input.

5. The system of claim 1, wherein the linked providers include at least one of a social media provider or a location provider.

6. The system of claim 1, wherein the provider information for the user includes photo posts on a social media provider account.

7. The system of claim 1, wherein the provider information for the user includes location information for a device associated with the user.

8. A non-transitory machine-readable medium having stored thereon machine-readable instructions executable to cause a machine to perform operations comprising:
determining a request for a user transaction includes an authentication;
transmitting a Short Message Service (SMS) link for an authentication input;
in response to receiving user information, determining which linked providers associated with the machine to request the user information from;
retrieving provider information for a user associated with the request for the use transaction from the linked providers determined;
performing a user assessment on the retrieved provider information and the user information received; and
authenticating the request for the user transaction based in part on the user assessment performed.

9. The non-transitory machine-readable medium of claim 8,
wherein the operations further comprise:
requesting, from the linked providers determined, a provider assessment based on the provider information and the received user information.

10. The non-transitory machine-readable medium of claim 9, wherein authenticating the request involves both the user assessment and the provider assessment.

11. The non-transitory machine-readable medium of claim 8, wherein the authentication input includes a redirect from the SMS link for a biometric input.

12. The non-transitory machine-readable medium of claim 8, wherein the linked providers include at least one of a social media provider or a location provider.

13. The non-transitory machine-readable medium of claim 8, wherein the provider information for the user includes location information for a device associated with the user.

14. A method comprising:
determining, by a system via a wireless network communication, a request for a user transaction includes an authentication;

transmitting a Short Message Service (SMS) link for an authentication input;
in response to receiving user information, determining which linked providers associated with the system to request the user information from;
retrieving provider information for a user associated with the request for the user transaction from the linked providers determined;
performing a user assessment on the retrieved provider information and the user information received; and
authenticating the request for the user transaction based in part on the user assessment performed.

15. The method of claim 14, further comprising:
requesting, from the linked providers determined, a provider assessment based on the provider information and the received user information.

16. The method of claim 15, wherein the authenticating the request involves both the user assessment and the provider assessment.

17. The method of claim 14, wherein the authentication input includes a redirect from the SMS link for a biometric input.

18. The method of claim 14, wherein the linked providers include at least one of a social media provider or a location provider.

19. The method of claim 14, wherein the provider information for the user includes photo posts on a social media provider account.

20. The method of claim 14, wherein the provider information for the user includes location information for a device associated with the user.

* * * * *

UNITED STATES PATENT AND TRADEMARK OFFICE
CERTIFICATE OF CORRECTION

| | |
|---|---|
| PATENT NO. | : 11,576,041 B2 |
| APPLICATION NO. | : 16/727899 |
| DATED | : February 7, 2023 |
| INVENTOR(S) | : Rahul Nair |

It is certified that error appears in the above-identified patent and that said Letters Patent is hereby corrected as shown below:

In the Claims

Claim 8, Column 12, Line 39, change "the request for the use transaction from the linked" to --the request for the user transaction from the linked--.

Signed and Sealed this
Fourteenth Day of March, 2023

Katherine Kelly Vidal
*Director of the United States Patent and Trademark Office*